United States Patent Office 3,591,476
Patented July 6, 1971

3,591,476
MANUFACTURE OF ALIPHATIC ALDEHYDES BY RADIOLYSIS
Hendrik Adriaan Jacobus Battaerd, North Clayton, Victoria, Australia, assignor to Imperial Chemical Industries of Australia and New Zealand Limited, Melbourne, Victoria, Australia
Filed Dec. 1, 1967, Ser. No. 687,241
Claims priority, application Australia, Dec. 12, 1966, 15,155; Dec. 21, 1966, 15,644
Int. Cl. B01j 1/10
U.S. Cl. 204—158
8 Claims

ABSTRACT OF THE DISCLOSURE

A process of converting alcohols into aldehydes which comprises irradiating alcohol with a source of high energy radiation in the presence of a solid energy transfer catalyst selected from the group consisting of CdO, ZnO, alpha alumina $Al_2O_3$, PbO, $Pb_3O_4$, $Sb_2O_3$, $Bi_2O_3$, $V_2O_5$, $WO_3$, MoO and copper, surface-oxidized to cuprous oxide.

Figure 1:
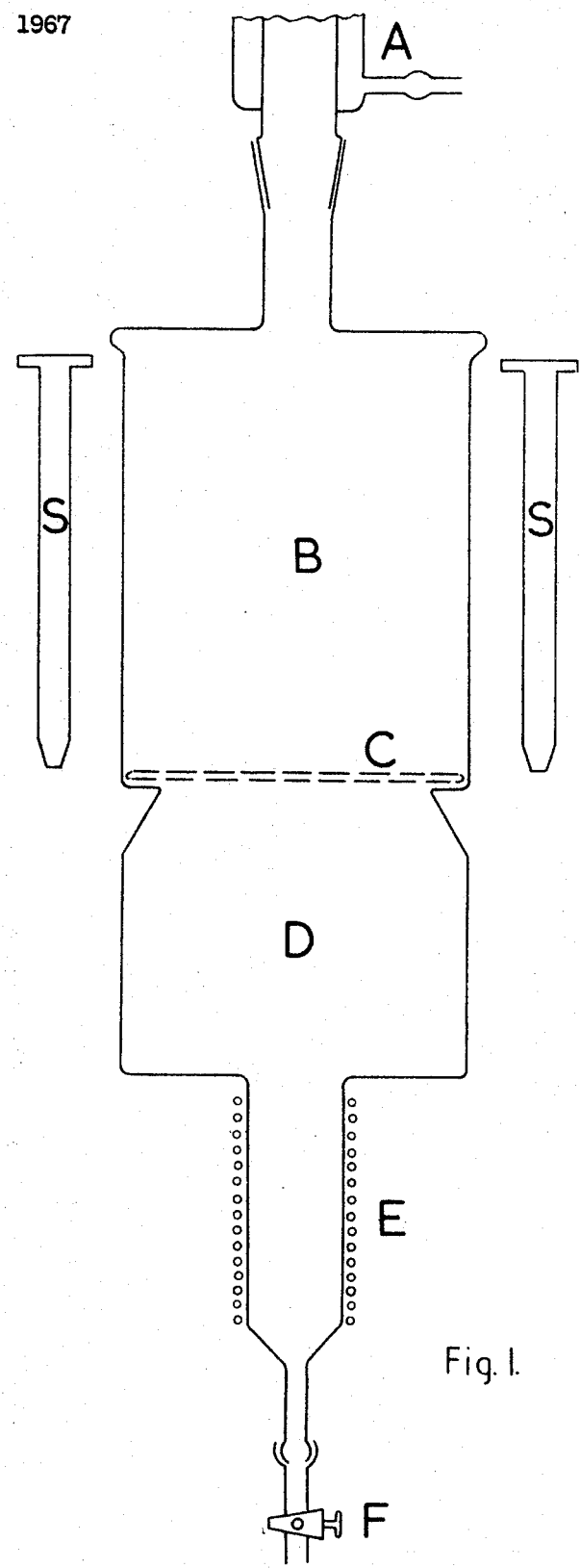

The present invention relates to the manufacture of aliphatic aldehydes and diols from alpihatic alcohols; in particular it relates to radiolytic processes for the manufacture of aldehydes and diols.

It is known, e.g. from W. R. McDonnell and A. S. Newton, J. Am. Chem. Soc., 76, 4651 (1954) that high energy-irradiation such as accelerated electrons, gamma rays, beta rays X-rays and corpuscular irradiation produced by atomic fission such as alpha particles, ionising high energy irradiation and gamma, beta and alpha radiation from isotopes produce, to the extent of trace reactions only, conversion of alcohols, e.g. methanol or ethanol into aldehydes, diols and other products, e.g. methane, ethane, hydrogen and others.

The quantities of aldehydes so produced are so minute, in the order of 0.005% formaldehyde in methanol at a radiation dose of $10^6$ rad per gramme, that this method of making aldehydes from alcohols has not attained practical significance for industrial manufacture.

We have now discovered that the yields obtainable per unit of irradiation can be bettered by several orders if the radiation is carried out in the presence of certain solid materials having a large surface area, capable of adsorbing the alcohol to be irradiated and of adsorbing radiation energy and thereby catalytically converting the adsorbed alcohol into the corresponding aldehydes. For convenience these substances will be referred to throughout this specification as energy transfer catalysts.

Accordingly we provide a process of converting alcohols into aldehydes which comprises irradiating alcohol with a source of high energy radiation in the presence of a solid energy transfer catalyst selected from the group consisting of CdO, ZnO, alpha alumina $Al_2O_3$, PbO, $Pb_3O_4$, $Sb_2O_3$, $Bi_2O_3$, $V_2O_5$, $WO_3$, $MoO_3$, CoO and copper, surface-oxidised to cuprous oxide as defined below.

Preferred alcohols are the lower aliphatic alcohols, particularly methanol. Suitable sources of irradiation, preferably limited to energies below the level at which radioactivity is created, i.e. below 3–7 mev., are e.g. accelerated electrons, gamma rays, beta rays, X-rays and corpuscular irradiation produced by atomic fission such as alpha particles, protons, neutrons and fast fission fragments.

Preferred energy transfer catalysts are $V_2O_5$ and particularly cuprous oxide deposited on copper, characterised in that the cuprous oxide is deposited on the copper by partial oxidation of the copper in air or oxygen at a temperature less than 200° C., preferably at room temperature, and characterised further in that between 20 and 100% of the surface area of said copper catalyst is oxidised to form an extremely thin layer of cuprous oxide. By extremely thin layer, we mean that the mass of cuprous oxide spread over the whole of the surface and determined by complete reduction with hydrogen to water, corresponds to a preferably monomolecular layer; less preferably this mass may also correspond to up to a trimolecular layer, always provided that a copper layer is the supporting substrate.

The surface area available is determined by the method described by J. H. Atkins, Anal. Chem., 36 (3), 579 (1964). A suitable rate of oxidation can be chosen according to F. Bouillon and G. Vander Schrick, J. Ch. Phys., vol. 59, 24 (1962). Although solid energy transfer catalysts having surface areas as low as 1 m.$^2$/g. are useful, it is preferred that these catalysts have a surface area greater than 100 m.$^2$/g. and more preferred that they have a surface area greater than 200 m.$^2$/g. e.g. 400 to 500 m.$^2$/g.

Our process may be carried out in the vapour phase and in the liquid phase. The reaction medium conveniently is the alcohol to be converted.

The effect of temperature on the irradiation yield, product and conversion is only slight so that temperatures ranging from —90 to 200° C. are operative; the choice of practical operating temperatures is largely a matter of convenience.

Dose rate and total dose do not critically affect the reaction either; thus dose rates from $10^2$ rads/hr. to $10^9$ rads/hr. and total dosages from $10^5$ rads to $10^{14}$ rads or more are operative. The total dose is only limited by technical considerations.

"Total dose" is defined as the total energy adsorbed by the adsorbing system expressed in rads in the reaction time considered, calculated as if the volume occupied by the system were occupied by dosimetry solution.

As a rule, during the radiation, part of the alcohol is also converted into diols.

A particular feature of our process is that only small to negligible amounts of diols are formed and furthermore that the desired aldehyde is formed in the complete absence of water. This is of great convenience for the production of anhydrous aldehyde which, compared with aqueous solutions, is preferable for many purposes, e.g. the manufacture of polyoxymethylene and for transport.

A further depression of the formation of diols may be achieved by the introduction of free radical scavengers.

Accordingly a preferred process for the manufacture of aldehydes as described above is characterised further in that free radical scavengers reducing the formation of diols are present.

Suitable free radical scavengers are iodides, iodine, boron compounds such as $B(OCH_3)_3$, benzoquinone, ferric ion, oxygen, nitrate ions, nitrous oxide (NO), chlorine, diphenylpicrylhydrazyl, polymerisable vinyl monomers such as styrene, cupric and cuprous oxide.

Preferred are ferric ion, cuprous oxide and oxygen, singly or in combination.

We consider that the rate of formaldehyde formation on our catalyst surface is greater than the rate of desorption of formaldehyde under reaction conditions; presumably after the initial formation of formaldehyde, an absorption-desorption equilibrium is established between formaldehyde and methanol which becomes rate determining. We have also appreciated that the weight of desired reaction product formed in the extremely thin adsorbed layer on the catalyst amounts to between 0.001 and 100% of the catalyst weight and that a substantial increase in reaction rate may be achieved and the problem of separating small amounts of reaction product from a large excess of alcohol can be solved economically if desorption of the reaction product is carried out in a separate step outside the irradiated reactor.

Accordingly we also provide a process of converting alcohol into aldehyde which comprises irradiating alcohol with a source of high energy irradiation in the presence of a solid energy transfer catalyst as defined above, reacting the alcohol on the surface of said substance to the aldehyde, removing said solid particulate substance from the radiation medium, separating the solid particles together with the adsorbed aldehyde from the fluid reaction medium and desorbing said aldehyde from the solid substance in a separate desorption step by known means.

Our invention is now illustrated by but not limited to the following examples.

EXAMPLES 1 TO 12 INCLUSIVE

For all Examples 1 to 12 experimental conditions were as follows:

The reactor consisted of a Pyrex test tube, provided with a ground glass stopper and a stop-cock. Gamma radiation was obtained from eight 250 curie Cobalt-sixty sources arranged in a circle. These sources fitted around a 3-litre Pyrex beaker provided with a circular test tube rack for eight test tubes arranged circumferentially in the beaker. The dose rate obtained from this arrangement was determined by a ferrous sulphate dosimetry. The reactors used were cleaned and filled up to the normal experimental level with dosimetry solution, which was prepared as follows:

Ferrous ammonium sulphate pentahydrate was recrystallised from water made slightly acid with sulfuric acid. A solution of 0.8 N sulphuric acid was made up with water re-distilled three times and completely saturated with oxygen. A weighed quantity of the dried ferrous salt sufficient to give a $20 \times 10^{-4}$ molar solution with respect to ferrous ion was dissolved in the aerated sulphuric acid. This solution was used for all dosimetry measurements.

To analyse irradiated solutions for ferric ions, advantage was taken of the strong ultraviolet adsorption of ferric ions under these conditions at 304 m$\mu$. All glassware for dosimetry purposes had been soaked in fresh chromic acid and thoroughly washed in triply distilled water. The dose rate to 0.8 N $H_2SO_4$ was determined using the Frick-Miller dosimeter with $G_{Fe^{+++}}=15.6$. The dose rate delivered to 0.8 N $H_2SO_4$ was $2.4 \times 10^5$ rads/hr.

The reaction vessel was charged with 5 grams of methanol (6.25 ml.) and a weighed quantity of energy transfer catalyst as set out in Table I so that the methanol present just covered the weighed amount of solid.

The reaction vessel and contents were freeze-degassed three times to 0.005 mm. Hg in liquid nitrogen.

Each experiment was started by placing the test tubes in said test tube rack in the 3-litre beaker and raising the radiation source from a shielding tank to surround the 3-litre beaker. The radiation source was kept in this position until a specified dose was delivered, and then lowered into the shielding tank.

Wherever methanol was used it was BDH analytical quality; all chemicals used in preparation of solutions and analyses were analytical grade reagents and applied without further purification.

The catalysts used were commercial samples as defined in Table II.

Before use all catalysts used in heterogeneous radiolysis were dried at 450° C. under vacuum and stored under vacuum over $P_2O_5$. After irradiation air was admitted to the cell and the aldehyde and glycol content determined. Formaldehyde was determined according to a modified procedure by C. E. Bricker and H. R. Johnson (Ind. & Eng. Chem. Anal., ed. 17 (6), 400 (1945)) with chromatropic acid.

Aliquots of irradiated methanol were analysed without removal of the methanol.

A calibration curve was established using a standard solution prepared from purified methanol and trioxane.

Ethylene glycol was determined by gas chromatography.

A calibration curve was established using a standard solution prepared from purified methanol and ethylene glycol.

Surface areas were determined according to the method of J. H. Atkins (Anal. Chem., 36 (3), 579 (1964)).

Analytical results are expressed as g./ml. $\times 10^6$.

As the measure of efficacy of the catalyst a "factor of merit" was used which takes into account the improvement over a standard prior art catalyst, the surface of the catalyst used and its mass. This permits assessment of the performance of the catalyst when further diminution, i.e. an increase in surface area, is achieved.

The "factor of merit," $f$, is defined as:

$$f = \frac{A - 3000}{W \times S}$$

where:

A is the amount of $CH_2O$ formed under standard conditions at 10 mrad in $10^{-6}$ g.
3000 is the amount of $CH_2O$ formed under standard conditions at 10 mrad with no catalyst (base value) in $10^{-6}$ g.
W is the weight of catalyst in g.
S is the surface area in m.² per g. of catalyst.

Results are given in Table I.

TABLE I

| Example Number | Energy transfer catalyst | Catalyst surface area, m.²/g. | Catalyst weight, g. | MeOH, g. | Radiation, mrad | $CH_2O$, grams $\times 10^{-6}$ | Factor of merit |
|---|---|---|---|---|---|---|---|
|  | Blank |  |  | 5 | 10 | 3,000 |  |
| 1 | CuO | 12 | 3.8 | 5 | 10 | 7,950 | 108 |
| 2 | ZnO | 12 | 4.1 | 5 | 10 | 11,300 | 230 |
| 3 | CdO | 8.6 | 8.0 | 5 | 10 | 19,400 | 280 |
| 4 | $Al_2O_3$ alpha | 2 | 9.3 | 5 | 10 | 6,200 | 330 |
| 5 | PbO | 1.3 | 45.0 | 5 | 10 | 12,300 | 160 |
| 6 | $Pb_3O_4$ | 1.6 | 36.6 | 5 | 10 | 13,650 | 180 |
| 7 | $Sb_2O_3$ | 7.6 | 9.9 | 5 | 10 | 21,000 | 240 |
| 8 | $Bi_2O_3$ | 3.1 | 25.5 | 5 | 10 | 22,350 | 240 |
| 9 | $V_2O_5$ | 8 | 6.2 | 5 | 10 | 23,400 | 410 |
| 10 | $WO_3$ | 11 | 8.6 | 5 | 10 | 19,250 | 180 |
| 11 | $MoO_3$ | 5 | 14.1 | 5 | 10 | 12,000 | 128 |
| 12 | CoO | 6.3 | 12.4 | 5 | 10 | 11,200 | 120 |

TABLE II.—SPECIFICATIONS OF ENERGY TRANSFER CATALYSTS

| Energy transfer catalyst | Composition | Description | Supplier |
|---|---|---|---|
| Copper oxide | CuO | Laboratory reagent | BDH. |
| Zinc oxide | ZnO | do | BDH. |
| Cadmium oxide | CdO | do | BDH. |
| Alpha alumina | $Al_2O_3$ | A 14 | Alcoa, Aluminium Company of America, Pittsburgh, Pa., U.S.A. |
| Lead oxide | PbO | Analar | Hopkins & Williams Ltd., Chadwell Heath, Essex, England. |
| Mixed lead oxide | $Pb_3O_4$ | Laboratory reagent | BDH. |
| Antimony trioxide | $Sb_2O_3$ | do | BDH. |
| Bismuth trioxide | $Bi_2O_3$ | do | Hopkins & Williams. |
| Vanadium pentoxide | $V_2O_5$ | do | BDH. |
| Tungstic oxide | $WO_3$ | do | BDH. |
| Molybdenum trioxide | $MoO_3$ | Analar | BDH. |
| Cobalt oxide | $CoO+Co_3O_4$ | Laboratory reagent | BDH. |

EXAMPLES 13 TO 16 INCLUSIVE

A Pyrex test tube of 60 ml. capacity was provided with a B19 Quickfit stopper and stop-cock. The test tube was charged with 10 g. of a metal oxide as specified below and a quantity of methanol sufficient to give total monomolecular surface cover, calculated for the surface area of the metal oxide and an area of 10 A.$^2$ for the methanol molecule. The charge was then degassed and equilibrated by degassing at liquid $N_2$ temperature, following by heating to 100° C. This process was carried out three times. After degassing, the tube and contents (still under vacuum) were exposed to Cobalt 60 gamma rays at a dose rate of $1.91 \times 10^5$ rads per hour as delivered to Frick-Miller dosimetry solution to a total dose of 10 mrad.

After irradiation air was admitted. The methanol remaining after irradiation and the formaldehyde were removed by evacuation at 100° C. and the product trapped in a trap containing a known amount of methanol and cooled in an acetone-Dry Ice mixture (−78° C.) and analysed for formaldehyde.

A series of test tubes was prepared and treated as above, but the radiation step was omitted. The product obtained from these test tubes contained no formaldehyde.

The experimental quantities and results of these experiments are contained in Table III.

TABLE III

| Ex. No. | Energy transfer catalyst | Catalyst weight, g. | Catalyst surface area, m.$^2$/g. | Methanol added, g. | Dose, mrad | Formaldehyde formed, g. |
|---|---|---|---|---|---|---|
| 13 | $Sb_2O_3$ | 10 | 7.6 | 0.0380 | 10 | 0.017700 |
| 14 | $Bi_2O_3$ | 10 | 3.1 | 0.0155 | 10 | 0.009750 |
| 15 | $V_2O_5$ | 10 | 8.0 | 0.0400 | 10 | 0.033800 |
| 16 | CdO | 10 | 8.6 | 0.0430 | 10 | 0.021800 |

EXAMPLE 17

A one litre Pyrex flask provided with a B24 Quickfit stopper and stop-cock was charged with 1100 grams of finely divided copper containing 1 gram of iron salts soluble in methanol with a surface area of 2.4 m.$^2$ per gram.

The flask was heated in an oven to 450° C. and the copper treated with hydrogen for 2 hours, followed by degassing to 0.005 mm. mercury at 450° C. This operation was repeated three times. The water formed during the reduction was collected in a trap in liquid $N_2$ and weighed.

The flask and contents were cooled to room temperature under hydrogen and degassed to 0.005 mm. mercury for 24 hours.

A charge of 400 ml. of methanol was added, degassed three times by freezing in liquid nitrogen.

The flask was then irradiated for 52.5 hours at a dose rate of $1.91 \times 10^5$ rads per hour to give a total nominal dose of approximately 10 megarad. This dose is the nominal dose received by the contents of the flask when filled with a ferrous sulphate dosimetry solution as described.

After the irradiation air was admitted and 400 ml. methanol added to cover all the copper. After allowing 12 hours for attainment of equilibrium an aliquot of the methanol was analysed. A total of 0.497 gram of formaldehyde formed and 0.012 gram of glycol had been formed.

The packing density of the copper powder was 1.9 g./ml. Data derived from this analysis compared with other experiments are represented in Table IV.

EXAMPLE 18

A one litre Pyrex flask provided with a B24 Quickfit stopper and stop-cock was charged with 1100 g. of finely divided copper, freed from methanol-soluble iron salts. The copper had a surface area of 2.4 m.$^2$ per g.

The flask was heated in an oven to 450° C.; the copper was then treated with hydrogen for 2 hours followed by degassing to 0.005 mm. Hg at 450° C. This operation was repeated three times. Air was then admitted at 450° C. and oxidation continued for 2 hours followed by degassing at 450° C. for 2 hours at 0.005 mm. mercury. After cooling under vacuum 400 ml. of methanol was injected and the vessel and contents were degassed three times by freezing in liquid nitrogen.

The flask and contents was then irradiated for a period of 52.5 hours at a dose rate of $1.91 \times 10^5$ rads per hour with cobalt-sixty gamma rays to give a dose of 10 megarad calculated for the flask containing the same volume of ferrous sulphate dosimetry solution. After irradiation, air was admitted and 400 ml. methanol added. After 12 hours for equilibration an aliquot of methanol with withdrawn and analysed as described previously yielding 0.4 g. of formaldehyde and 0.03 g. of glycol in total.

The methanol, formaldehyde and glycol were then removed under vacuum finally at 450° C. and the contents of the flask degassed at this temperature for 2 hours. Hydrogen was then admitted and the contents of the flask reduced to copper. The water formed was collected under vacuum in a cold trap. 3 g. of water were collected, which corresponded to 13.3 g. CuO, i.e. surface oxide in excess of a trimolecular layer on the copper.

EXAMPLE 19

Example 19 was carried out as for Example 18, but the contents of the flask were oxidised further then in Example 18 so that the catalyst contained 400 g. CuO and 790 g. Cu.

The analyses after radiation yielded 0.4 g. of formaldehyde and 0.03 g. of glycol.

EXAMPLE 20

Example 20 was carried out as for Example 18 but air was admitted during the radiation.

The analyses after radiation yielded 0.598 g. of formaldehyde and 0.02 g. of glycol.

EXAMPLE 21

Example 21 was carried out as for Example 18 but two additional degassing cycles were added after the addition of methanol.

The analysis yield 0.4 g. of formaldehyde and 0.132 g. of glycol.

EXAMPLE 22

A one litre Pyrex flask provided with a B24 Quickfit stopper and stop-cock was charged with 1100 g. of finely divided copper with a surface area of 2.4 m.$^2$/g. The flask was heated to 450° C. in a furnace and then hydrogen was admitted for 2 hours. The flask was then evacuated and degassed for 2 hours at 0.005 mm. Hg for 2 hours. This procedure was followed by another reduction and degassing cycle. The flask and contents were then cooled to 100° C. under vacuum and air passed at 100° C. for 16 hours. The flask was then degassed for 2 hours at 100° C. at 0.005 mm. Hg and cooled to room temperature under vacuum. 400 ml. of methanol were injected under vacuum and the vessel was degassed in three cycles with liquid $N_2$.

The flask and contents were then radiated for 52.5 hours at a dose rate of $1.91 \times 10^5$ rads/hour with Cobalt-sixty gamma rays to give a total nominal dose of 10 mrad, calculated for ferrous sulphate dosimetry solution.

After irradiation, air was admitted and 400 ml. methanol added. After 12 hours for equilibration an aliquot of methanol was withdrawn and analysed as described above; it yielded 0.644 g. of formaldehyde and 0.036 g. of glycol.

The methanol was removed from the copper in the flask under vacuum and the contents were degassed for 2 hours at 450° C. Hydrogen was carried through at this temperature and 10.2 g. of water collected in a cold trap on degassing.

This corresponds to 81 g. of $Cu_2O$ present as a surface oxide on the copper powder, which corresponds to an excess over a trimolecular layer of cuprous oxide.

EXAMPLE 23

Example 23 was carried out as for Example 22 but the radiation was carried out in the presence of air. The analysis yielded 0.644 g. of formaldehyde and 0.036 g. of glycol.

EXAMPLE 24

This example demonstrates a preferred form of this invention.

A one litre Pyrex flask provided with a Quickfit B24 stopper and stop-cock was charged with 1100 g. of finely divided copper with a surface area of 2.4 m.$^2$/g.

The flask and contents were heated to 450° C. and the copper treated with $H_2$ for 2 hours followed by degassing at 0.005 mm. Hg for 2 hours. This cycle of reduction and degassing was repeated twice, until no more water was formed.

The flask and contents were cooled to room temperature under vacuum and then opened to air, 400 ml. of methanol were added without degassing and the contents equilibrated for 3 days. The flask and contents were then radiated under exposure to the air for 52.5 hours at a dose rate of $1.91 \times 10^5$ rads/hour of Cobalt-sixty gamma radiation to give a total nominal dose of 10 mrad as delivered to ferrous sulphate dosimetry solution.

After radiation 400 ml. of methanol were added and equilibrated for 12 hours. An aliquot was withdrawn yielding the following analysis: formaldehyde, 1.50 g. and glycol 0.008 g. On reduction as in previous experiments the copper yielded 0.2 g. of water equivalent to 1.6 g. of $Cu_2O$, representing less than 100% cover by a monomolecular surface layer on the copper surface present.

TABLE IV.—RESULTS OF EXAMPLES 17-24

| Ex. No. | Energy transfer catalyst | $CH_2O$ in g. | $(CH_2OH)_2$ in g. |
|---|---|---|---|
| 17 | Unoxidised copper with iron contamination. | 0.497 | 0.012 |
| 18 | Partially oxidised to cupric oxide free from iron. | 0.4 | 0.03 |
| 19 | As in Example 18 further oxidised | 0.4 | 0.03 |
| 20 | As in Example 18 in presence of air | 0.6 | 0.02 |
| 21 | Reduced copper degassed | 0.4 | 0.132 |
| 22 | Oxidised to cuprous oxide in vacuum | 0.644 | 0.036 |
| 23 | As in Example 22 in air | 0.644 | 0.036 |
| 24 | Surface oxidised copper in air, less than 100% monomolecular layer. | 1.50 | 0.008 |

Example 18 to 23 represent surface layers of copper oxides on copper in excess of a trimolecular layer. Initial copper weight was 11 g., initial surface area of the copper was 2.4 m.$^2$/g., methanol added for equilibration was 400 mls. and radiation dose was 10 mrad in all examples of Table IV.

EXAMPLES 25–32 INCLUSIVE

These examples demonstrate the effect of surface area cover on yield.

A one litre Pyrex flask provided with a B24 Quickfit stopper and stop-cock was charged with catalysts as specified in Table V. The flask was heated to 450° C. in a furnace, evacuated and degassed at 0.005 mm. Hg for 2 hours, and cooled under this vacuum to room temperature. Degassed methanol was then added to give a calculated surface cover of 10 to 100% when adsorbed.

The catalyst used was vanadium pentoxide, a laboratory reagent made by BDH.

Experimental results are set out in Table V.

TABLE V.—EFFECT OF SURFACE AREA COVER

| Ex. No. | Wt. $V_2O_5$, g. | Weight $CH_3OH$, g. | Percent surface area cover | Dose, Mrad | $CH_2O$, g. | $\left(\dfrac{CH_2O}{CH_3OH} \times 100\right)$ |
|---|---|---|---|---|---|---|
| 25 | 718 | 2.82 | 100 | 5 | 1.17 | 41.5 |
| 26 | 718 | 2.26 | 80 | 5 | 1.06 | 47 |
| 27 | 718 | 1.69 | 60 | 5 | 1.01 | 60 |
| 28 | 718 | 1.41 | 50 | 5 | 0.872 | 62 |
| 29 | 718 | 1.13 | 40 | 5 | 0.56 | 50 |
| 30 | 718 | 0.85 | 30 | 5 | 0.304 | 36 |
| 31 | 718 | 0.56 | 20 | 5 | 0.168 | 30 |
| 32 | 718 | 0.28 | 10 | 5 | 0.053 | 19 |

It can be seen that yield of formaldehyde $$\left(\frac{\text{formaldehyde (in g.)}}{\text{methanol (in g.)}} \times 100\right)$$

is a function of surface cover, reaching a maximum at approximately 50% cover for vanadium pentoxide. Above 50% surface cover the total amount of formaldehyde formed is relatively independent of surface cover.

This procedure is exemplified in Examples 33 and 34 for two materials: copper supported cuprous oxide representing a catalyst promoting formaldehyde.

EXAMPLE 33

Example 24 was repeated but only 1.33 g. of methanol was added, instead of 400 mls., so that an approximately monomolecular layer of methanol on the cuprous oxide surface layer was obtained. The flask was degassed, closed with a stopper and gently rotated for 2 hours to equilibrate the charge.

The flask was then again opened to air and exposed to radiation of Cobalt-sixty at a dose rate of $1.91 \times 10^5$ rads/hour, to a total dose, as defined, of 9.8 mrad.

The flask was then degassed and the reaction products collected in a trap at liquid nitrogen temperature. The trap contained 1.29 g. of formaldehyde and 0.008 g. of glycol. Water could not be detected; a total yield $$\frac{\text{formaldehyde (g.)}}{\text{methanol (g.)}} \times 100$$

was 98%.

EXAMPLE 34

A high surface area copper was prepared from a 6% solid solution of copper in aluminium (alloy) by treating the alloy with strong sodium hydroxide (10% by weight) solution until all aluminium was dissolved and no more hydrogen evolved. This copper was filtered, washed free from salts and dried under a nitrogen blanket and charged in a one litre Pyrex flask as in Example 33. The charge was 790 g. of copper with a surface area of 213 m.$^2$/g. and a packing density of 1.4 g./cc. The flask and contents were treated as in Example 33. However, air was admitted in a controlled manner, gradually after a period of 12 hours to prevent undue oxidation and rise of temperature until an essentially monomolecular layer of cuprous oxide (about 100% surface cover) was obtained.

84 g. of methanol were then injected, the flask was stoppered and the contents equilibrated for 38 hours. The flask and contents were then exposed to radiation as in Example 33 to a total dose of 10.2 mrad. The flask was degassed and the products collected in a trap cooled with liquid nitrogen.

The trap contained 79.6 g. of product consisting of 76 g. of formaldehyde, 0.55 g. of glycol and 3 g. of methanol, and showed an overall efficiency of 89.5%.

EXAMPLE 35

This example describes an experiment carried out in a Pyrex glass reaction vessel as depicted in FIG. 1, which is a diagrammatic sketch in side elevation through the reaction vessel. Space B was substantially filled with the catalyst listed in Table VI and the catalyst was supported on catalyst bed support C. 250 ml. of methanol were placed in boiler D and heated to reflux temperature by heating coils E and maintained under total reflux across the catalyst bed, being condensed in reflux condenser A. The space B and its contents were exposed to radiation from a Cobalt-sixty source S surrounding space B.

The dose rate in the catalyst bed was $1.91 \times 10^5$ rads/hour. A steady state of product formation was attained after 24 hours.

The results obtained using as catalysts cuprous oxide and vanadium pentoxide are set out in Table VI.

TABLE VI.—RESULTS OF EXAMPLE 35

| Catalyst type | $Cu_2O$ as monomolecular layer on CU [1] | $V_2O_5$ analytical grade |
|---|---|---|
| Catalyst weight, g | 1,365 | 767 |
| Catalyst surface area, m.²/g | 15 | 8 |
| Radiation dose, mrad | 44 | 44 |
| Formaldehyde after 44 mrad, percent w./w. | 4.9 | 4.9 |
| Glycol after 44 mrad, percent | 0.026 | ([2]) |

[1] Prepared as in Example 24.
[2] Not measurable.

EXAMPLE 36

Figure 2:
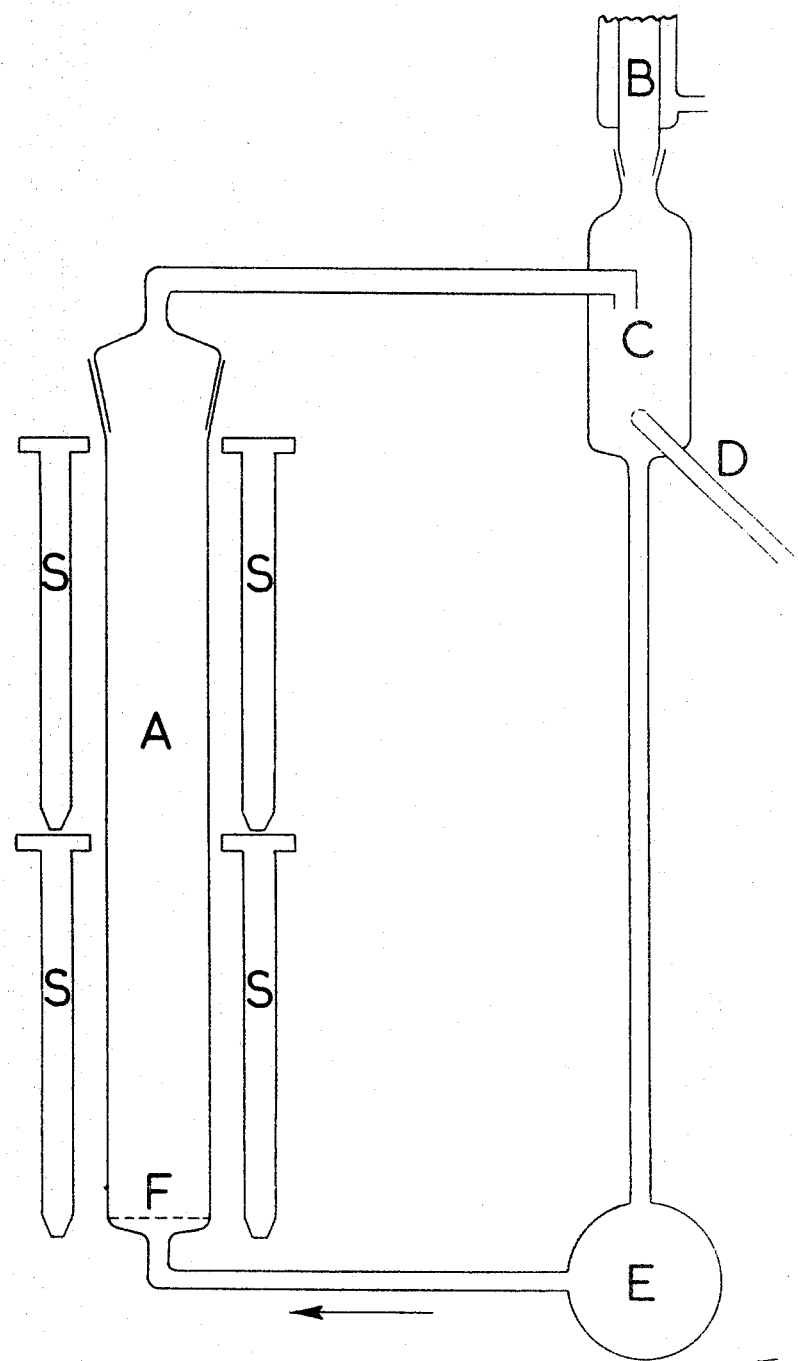

This example was carried out in a Pyrex glass tubular reactor A, depicted in FIG. 2 which is a diagrammatic sketch in side elevation through the apparatus. The reactor A was provided with a catalyst support consisting of a sintered glass disc F. The reactor A was surrounded by a Cobalt-sixty radiation source S and inserted in a circulation system consisting of a pump E and a receiver C provided with an aerator D the receiver C being open to the atmosphere through a condenser B. The reactor A above the sintered glass disc F was packed with a copper supported cuprous oxide catalyst, prepared as described in Example 34, so that the catalyst substantially filled tubular reactor A. The catalyst charge, weighing 113 g., had a surface area of 213 m.²/g., a packing density of 1.35 g./cc. and a density of 8.92.

100 ml. of methanol was charged into the apparatus and by means of pump E was circulated at a rate of 60 ml. per hour through the catalyst bed, supported on the sintered glass disc F and through the tubular reactor A where it was irradiated by the eight Cobalt sixty sources S, each of 250 curies, which surrounded the reactor A. Oxygen was introduced into the circulating liquid at the rate of 10 ml./min. through the aerator D.

The dose rate delivered to the reactor was $4.93 \times 10^5$ rads per hour and the reaction was continued for a period of 50 hours. The results of analyses performed on samples withdrawn from the circulating liquid at intervals over the reaction period are set out in Table VII.

TABLE VII

| Reaction time (hours) | $CH_2O$, percent | Glycol |
|---|---|---|
| 10 | 5.0 | Not measurable. |
| 20 | 11.2 | Do. |
| 30 | 15.9 | Trace. |
| 40 | 21.4 | Do. |
| 50 | 24.3 | 0.1 percent. |

A substantially constant rate of formation of formaldehyde was achieved until the formaldehyde concentration in the circulating liquid reached about 20%. At this concentration and above some turbidity was observed, probably due to polymerisation, and gas chromatographic analyses showed substantial amounts of high boiling by-products not further identified. The formation of glycol was suppressed to a large extent. Only traces of glycol could be detected after 30 and 40 hours reaction time and after 50 hours the glycol content was 0.1%.

EXAMPLE 37

Example 36 was repeated using, however, pure ethyl alcohol (Merck).

Results are represented in Table VIII.

TABLE VIII

| Hours | Percent acetaldehyde | Percent formaldehyde | Percent total glycols |
|---|---|---|---|
| 10 | 2.9 | 0.5 | |
| 20 | 8.7 | 1.1 | |
| 30 | 12.1 | 3.2 | Trace. |
| 40 | Precipitate | | |
| 50 | Precipitate | | |

The total amount of by-products insoluble in the alcohol became noticeable after 30 hours and clogged the pump and column support. No clear-cut product advantage was obtained, but acetaldehyde was formed in excess of the quantity expected from the experiments of L. W. Sieck, R. H. Johnson, J. Phys. Chem., 69 (5), 1699 (1965).

EXAMPLE 38

Example 36 was repeated but the methanol in that example was replaced by n-butyl alcohol (Merck, pro Analysi, absolute). The results obtained are set out in Table IX.

TABLE IX

| Hours | Percent total aldehyde | Percent total glycols |
|---|---|---|
| 10 | 3.1 | |
| 20 | 9.3 | |
| 30 | 13.4 | Trace. |
| 40 | 16.3 and some precipitate | Do. |
| 50 | Precipitate | Do. |

The total amount of by-products insoluble in the alcohol became noticeable after 40 hours and clogged the pump and column support. The yields of aldehyde, calculated as butyl aldehyde, were several orders of magnitude larger than could be expected from the experiments of W. R. McDonell and Amos S. Newton, J.A.C.S. 76, 4651 (1954).

EXAMPLE 39

The following example describes a process wherein the reaction product is removed from the surface of the catalyst and the catalyst is then re-used. Example 33 was repeated and after the reaction products had been removed from the catalyst, the process was repeated twice using the same catalyst without regeneration. Amounts of formaldehyde and glycol similar to those obtained in the original example were obtained in the repeated processes.

EXAMPLE 40

1100 g. of finely divided copper having a surface area of 2.4 m.²/g. was placed in a one litre Pyrex flask which was provided with a Quickfit B24 stopper with stopcock as well as a bottom outlet fitted with a sintered glass disc, a tap and a stopper. The flask and contents were heated to 450° C. and the copper was treated with hydrogen for 2 hours followed by degassing at 0.005 mm. Hg for 2 hours. This cycle of reduction and degassing was repeated until no more water was formed, i.e. two more times. The flask and contents were cooled to room temperature under vacuum and then opened to air. 400 ml. methanol were added without degassing and the contents equilibrated for 3 days. The flask and contents were then radiated under exposure to air for 52.5 hours at a dose rate of $1.91 \times 10^5$ rads/hour of Cobalt 60 gamma radiation to give a total nominal dose of 10 mrad as delivered to ferrous sulphate dosimetry solution occupying the same volume as the charge in the flask. The flask and contents were then removed from the vicinity of the radiation source and the excess methanol was withdrawn from the bottom of the flask leaving the catalyst together with adsorbed reaction products, as well as a very small amount of methanol, in the flask. A further 400 ml. methanol was added to the residual contents of the flask and was allowed to equilibrate for 12 hours during which time it desorbed the reaction products from the catalyst. The mixture of methanol and reaction product was withdrawn from the bottom of the flask and added to the excess methanol referred to above, this latter containing a small amount of reaction product. An analysis of the combined methanol portions showed that 1.56 g. formaldehyde and 0.006 g. glycol had been formed. The process as described above was repeated except that the catalyst was not regenerated prior to adding a fresh charge of 400 ml. methanol and a further 1.50 g. formaldehyde and 0.006 g. glycol was formed. The catalyst on reduction as in Example 22 yielded 0.2 g. water equivalent to 1.6 g. $Cu_2O$, representing less than 100% cover by a monomolecular surface layer on the copper surface present.

We claim:

1. A process of converting an alcohol selected from the group consisting of methanol, ethanol and n-butanol into aldehyde, which process comprises irradiating said alcohol with a source of high energy radiation in contact with a solid energy transfer catalyst selected from the group consisting of CdO, ZnO, alpha-alumina $Al_2O_3$, PbO, $Pb_3O_4$, $Sb_2O_3$, $Bi_2O_3$, $V_2O_5$, $WO_3$, $MoO_3$, CoO and $Cu_2O$, the quantity of alcohol present corresponding to an amount sufficient to provide no more than a molecular layer of alcohol in contact with the metal oxide surface.

2. A process as claimed in claim 1 wherein the solid energy transfer catalyst has a surface area in the range from 1 to 500 m.$^2$/g.

3. A process as claimed in claim 1 wherein at least one free radical scavenger reducing the formation of diols is present.

4. A process of converting alcohol selected from the group consisting of methanol, ethanol and n-butanol into aldehyde, which process comprises irradiating said alcohol with a source of high energy radiation in contact with a solid energy transfer catalyst, said catalyst comprising cuprous oxide deposited on copper characterized in that the cuprous oxide is deposited on the copper by partial oxidation of the copper in the presence of an oxygen containing gas at a temperature less than 200° C. and wherein between 20% and 100% of the surface area of said copper catalyst is oxidized to form a layer of cuprous oxide which corresponds to up to a trimolecular layer always provided that a copper layer is the supporting substrate.

5. A process according to claim 4 characterized further in that the quantity of alcohol present corresponds to an amount sufficient to provide no more than a monomolecular layer of alcohol in contact with the cuprous oxide surface.

6. A process according to claim 4 wherein the solid energy transfer catalyst has a surface area in the range from 1 to 500 m.$^2$/g.

7. A process according to claim 4 characterized further in that at least one free radical scavenger reducing the formation of diols is present.

8. A process of converting alcohol selected from the group consisting of methanol, ethanol and n-butanol into aldehyde, which process comprises irradiating alcohol with a source of high energy radiation in contact with a solid energy transfer catalyst selected from the group consisting of CdO, ZnO, alpha-alumina $Al_2O_3$, PbO, $Pb_3O_4$, $Sb_2O_3$, $Bi_2O_3$, $WO_3$, $MoO_3$, CoO, $V_2O_5$ and $Cu_2O$, converting said alcohol on the surface of said catalyst to the aldehyde, removing said catalyst together with adsorbed aldehyde from the radiation medium, separating the solid catalyst together with the adsorbed aldehyde from the fluid reaction medium and desorbing said aldehyde from the solid catalyst in a separate desorption step by known means.

References Cited

UNITED STATES PATENTS

| | | | |
|---|---|---|---|
| 3,002,911 | 10/1961 | Sutherland et al. | 204—158 |
| 3,228,848 | 1/1966 | Fellows | 204—158X |
| 3,301,774 | 1/1967 | Hentz | 204—158 |

OTHER REFERENCES

J. Physical Chemistry, 69 (5), 1699–1703 (1965).

HOWARD S. WILLIAMS, Primary Examiner